United States Patent
Meng et al.

(10) Patent No.: US 10,490,188 B2
(45) Date of Patent: Nov. 26, 2019

(54) SYSTEM AND METHOD FOR LANGUAGE SELECTION

(71) Applicant: TOYOTA MOTOR ENGINEERING & MANUFACTURING NORTH AMERICA, INC., Erlanger, KY (US)

(72) Inventors: Ming Michael Meng, Erlanger, KY (US); Krishna Buddharaju, Novi, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 28 days.

(21) Appl. No.: 15/701,750

(22) Filed: Sep. 12, 2017

(65) Prior Publication Data
US 2019/0080691 A1    Mar. 14, 2019

(51) Int. Cl.
*G10L 15/00* (2013.01)
*G10L 15/22* (2006.01)
*G10L 15/30* (2013.01)
*G06F 9/451* (2018.01)

(52) U.S. Cl.
CPC .............. *G10L 15/22* (2013.01); *G06F 9/454* (2018.02); *G10L 15/30* (2013.01); *G10L 15/005* (2013.01); *G10L 2015/223* (2013.01)

(58) Field of Classification Search
CPC .......... G09B 5/04; G10L 15/005; G10L 15/07
USPC ...................................................... 704/275
See application file for complete search history.

(56) References Cited

U.S. PATENT DOCUMENTS

| | | |
|---|---|---|
| 5,991,719 A | 11/1999 | Yazaki et al. |
| 9,129,591 B2 | 9/2015 | Sung et al. |
| 9,536,521 B2 | 1/2017 | Golding et al. |
| 9,953,630 B1 * | 4/2018 | Aubrey ................ G10L 15/005 |
| 2004/0098259 A1 | 5/2004 | Niedermair |
| 2005/0131685 A1 | 6/2005 | Roth et al. |
| 2014/0272821 A1 * | 9/2014 | Pitschel ................ G09B 19/06 434/157 |
| 2015/0006147 A1 | 1/2015 | Schmidt |
| 2017/0011735 A1 | 1/2017 | Kim et al. |
| 2018/0043903 A1 * | 2/2018 | Hosey ............... B60W 50/0098 |

FOREIGN PATENT DOCUMENTS

CN          104978015          10/2015

* cited by examiner

*Primary Examiner* — Daniel Abebe
(74) *Attorney, Agent, or Firm* — Oblon, McClelland, Maier & Neustadt, L.L.P.

(57) ABSTRACT

A method and system for language selection and synchronization in a vehicle are provided. The method includes receiving an audio representative of sounds captured within a vehicle, recognizing a language category for propagating information to a user of the vehicle according to the received audio, selecting the language category of the vehicle system according to the recognized language category in response to receiving a user acknowledgment, synchronizing the language category among a plurality of vehicle systems, and propagating information to the user of the vehicle using the synchronized language category.

20 Claims, 5 Drawing Sheets

SYSTEM AND METHOD FOR LANGUAGE SELECTION

BACKGROUND

Multiple systems in a vehicle may provide information to the user such as navigation information. The information is propagated to the user according to a predefined language category which may not be a language category familiar to a user of the vehicle. U.S. Pat. No. 9,129,591 B2 entitled "Recognizing speech in multiple languages" by Sung et al. describes a system and method that identifies a candidate language for a received audio.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

According to an embodiment of the present disclosure, there is provided a method for language selection and synchronization. The method includes receiving an audio representative of sounds captured within a vehicle, recognizing a language category for propagating information to a user of the vehicle according to the received audio, selecting the language category of a vehicle system according to the recognized language category in response to receiving a user acknowledgment, synchronizing the language category among a plurality of vehicle systems, and propagating information to the user of the vehicle using the synchronized language category.

According to an embodiment of the present disclosure, there is provided a non-transitory computer-readable medium storing instructions which, when executed by at least one processor, cause the at least one processor to perform the above-described method for language selection and synchronization in a vehicle.

According to an embodiment of the present disclosure, there is provided a system for language selection and synchronization. The system includes a plurality of vehicle systems; and processing circuitry. The processing circuitry is configured to receive an audio representative of sounds captured within a vehicle; recognize a language category for propagating information to a user of the vehicle according to the received audio; select the language category of a vehicle system according to the recognized language category in response to receiving a user acknowledgment; synchronize the language category among the plurality of vehicle systems; and propagate information to the user of the vehicle using the synchronized language category.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
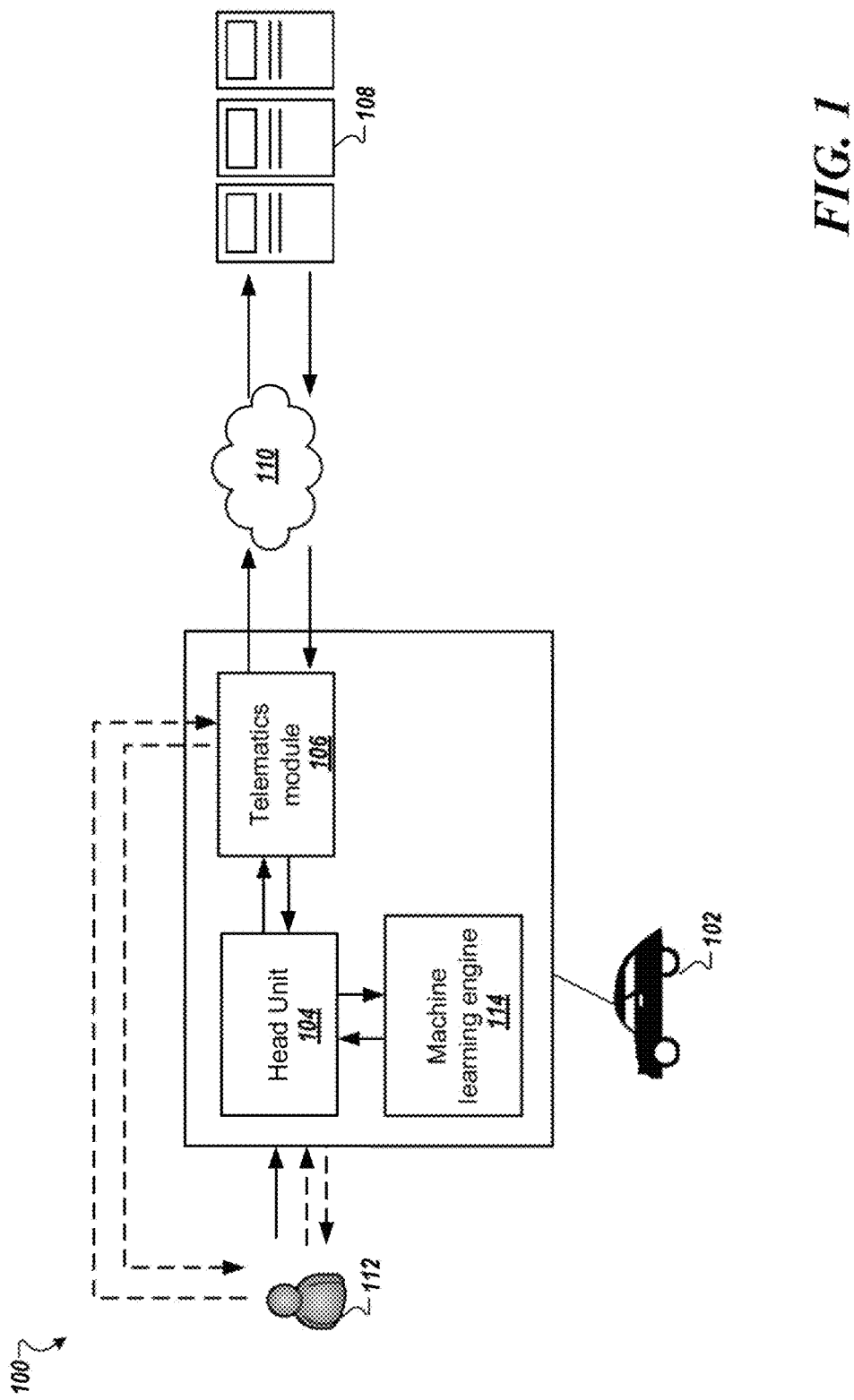
FIG. 1 is a schematic of a system environment according to one example.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Referring now to the drawings, wherein like reference numerals designate identical or corresponding parts throughout several views, the following description relates to a system and associated methodology for language selection and synchronization within multiple systems of a vehicle.

Multiple systems (e.g., head unit, telematics module) in the vehicle may provide information to a user in a predefined language category. Language setting for the head unit may be changed by the user of the vehicle in a head unit menu. A telematics module in the vehicle has a language setting that is controlled by a telematics service provider (TSP). In current systems, a change in the language setting in the head unit menu is not reflected in the telematics module which may cause confusion and frustration for the user and diminish the overall user experience in the vehicle.

FIG. 1 is a schematic of a system environment 100 according to one example. A vehicle 102 may include a head unit 104 and a telematics module 106. The telematics module 106 may be a data communication module (DCM) that provides communications over a network 110 to one or more servers that may be included with multiple services available to a vehicle user 112 such as a server associated with the TSP 108. The network 110 may be a cellular network. The vehicle 102 may include an antenna for communication with the cellular network. The cellular network may include a plurality of base stations that are configured to receive and transmit data over wired systems such as public switched telephone network (PSTN) and backhaul networks. The cellular network can include wide area networks, metropolitan area networks, the Internet, satellite networks, or the like. Thus, the base stations include one or more antennas, transceivers, and processors that execute machine readable instructions to exchange data over various wired and/or wireless networks.

The head unit 104 may provide audio and video services to the vehicle user 112. The head unit 104 may also provide navigation services, entertainment such as music, heating, ventilating, and air-conditioning information. The head unit 104 may receive telematics services in association with the telematics module 106. The head unit 104 may include a controller 202, a memory 204, and a communication module 206 as shown in FIG. 2.

Figure 2:
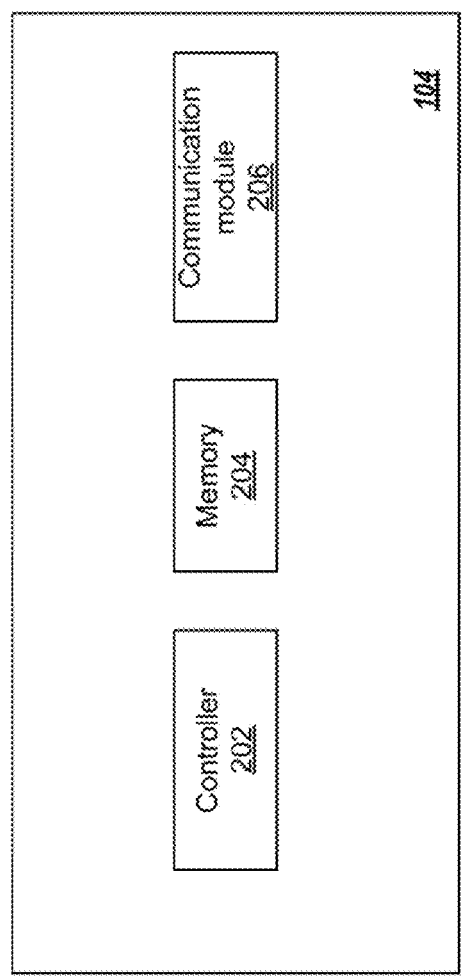
FIG. 2 is a block diagram of a head unit according to one example.

FIG. 2 is a block diagram of the head unit 104 according to one example. The controller 202 controls overall operation of the head unit 104 of the vehicle 102. The memory 204 may be controlled by the controller 202. The communication module 206 is configured to communicate with the telematics module 106. The communication module 206 may communicate via Bluetooth, WiFi, Universal serial bus (USB), or the like.

The head unit 104 may include multiple settings that include a language setting. The settings may be stored in the memory 204. The head unit 104 may receive inputs from the vehicle user 112 via one or more user interfaces (e.g., console display, dash display). The user interface may include buttons, a multiple touch input device, a microphone, and speakers. The microphone may be configured to receive user voice commands and capture sound within the vehicle 102.

The multiple touch input device may be a touchscreen including a touch sensitive surface or a display overlaid with the touch sensitive surface such as a multi-touch input surface (MTIS). Multiple technologies exist for detecting a user's touch using a touch sensitive surface including capacitive technologies, resistive technologies, optical technologies, wave technologies, or other technologies as would be understood by one of ordinary skill in the art.

The display may be a liquid crystal display using fluorescent or light emitting diode (LED) back lighting, an LED display, or other flat panel display as would be understood by one of ordinary skill in the art. The display may be of different sizes.

Figure 3:
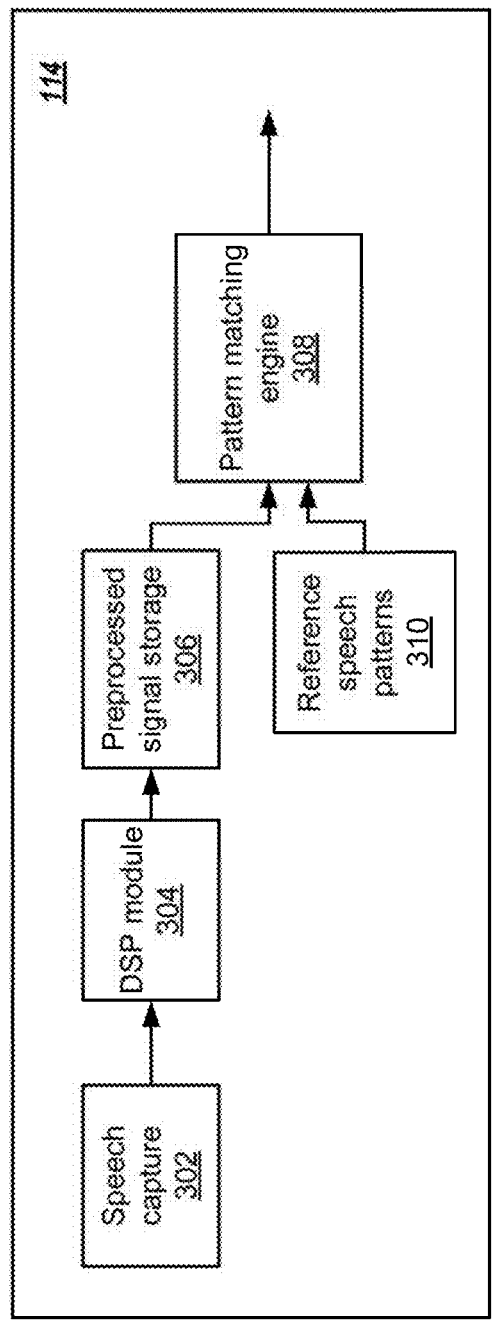
FIG. 3 is a block diagram of a machine learning engine according to one example.

Referring back to FIG. 1, the vehicle 102 may also include a machine learning engine 114. The machine learning engine 114 may receive an audio from the head unit 104 and recognize a language category. A block diagram of the machine learning engine 114 is shown in FIG. 3. The machine learning engine 114 may output the recognized language category to the head unit 104. The head unit 104 may change the language setting (e.g., predefined language category) according to the recognized language category. In one example, the language setting may be changed upon prompting by the head unit 104 and acknowledgement by the vehicle user 112. The prompt may be in one or more languages. For example, the prompt may be in the recognized language category and the previously predefined language category. The previously predefined language category may be the last stored language category in the memory 204. Further, the head unit 104 may output a signal to the telematics module 106 to change the language category of the TSP 108 according to the recognized language category as described further below. In FIG. 1, dashed arrows represent system input/output and solid arrows represent language settings.

The modules and engines described herein may be implemented as either software and/or hardware modules and may be stored in any type of computer-readable medium or other computer storage device. For example, each of the modules described herein may be implemented in circuitry that is programmable (e.g., microprocessor-based circuits) or dedicated circuits such as application specific integrated circuits (ASICS) or field programmable gate arrays (FPGAS). In one embodiment, a central processing unit (CPU) could execute software to perform the functions attributable to each of the modules described herein. The CPU may execute software instructions written in a programming language such as Java, C, or assembly. One or more software instructions in the modules may be embedded in firmware, such as an erasable programmable read-only memory (EPROM).

The head unit 104 may change the language category by continuously monitoring audio within the vehicle 102 to recognize spoken languages or by detecting a user request. The head unit 104 may detect a user request to change the language category via multiple methods. For example, the head unit 104 may detect an input via the user interface (e.g., via a button). The head unit 104 may also detect a voice command such as "Change language to French" captured by the microphone. The content of the voice command may be determined by the machine learning engine 114. The head unit 104 may change the language category in the language setting to French. Then, the head unit 104 may send a signal to the telematics module 106 indicating a change in the language setting. In turn, the telematics module 106 may output a signal to the TSP 108 indicating the change in the language setting. The language category associated with the TSP 108 is updated to French.

The telematics module 106 and/or TSP 108 may detect a change in the language setting via a user interface associated with the telematics module 106 and/or the TSP 108. The telematics module 106 outputs a signal to the head unit 104 indicating the change in the language setting. In response to detecting the signal, the head unit 104 may modify the language setting of the head unit 104 according to the received language setting.

The head unit 104 may continuously monitor sounds and audio (i.e., detect sounds within the vehicle) and determine whether a language category is recognized for a predetermined time period (e.g., ten seconds, thirty seconds) or a predetermined number of successive words (e.g., five words) in the language category is detected. In response to determining that the recognized language does not match the current setting (i.e., the recognized language does not match the predefined language), the head unit 104 may check to see whether the vehicle user 112 wants to modify the language setting to the recognized language. For example, the head unit 104 may detect "Chinese" being spoken in the vehicle 102. The head unit 104 prompts the vehicle user 112 to check whether the vehicle user 112 wants to change the predefined language from English to Chinese. Also, if the vehicle user 112 accidentally changes the setting to a language that the vehicle user 112 does not speak, the head unit 104 may automatically detect a request to change back the language setting. The vehicle user 112 may activate or deactivate the language monitoring. For example, the system may include an activation switch for activating or deactivating the language monitoring. This provide the advantage of deactivating the language monitoring when additional passengers in the vehicle 102 are speaking a language different than the predefined language category and the vehicle user 112 does not want to change the language category.

The change in the language category may be temporary. The signal sent to the telematics module 106 may also indicate the duration of the change of the language setting. For example, the user may input "change the language settings to "French" for the duration of this trip". The trip may be determined by detecting activation of the vehicle 102 such as turning on the engine until the engine is turned off. In response to determining that the trip has been completed, the head unit 104 may change the language category according to the previous predefined language category. The previous predefined language category may be retrieved from the memory 204. The duration for the change may also be fixed by the vehicle user 112 such as 5 minutes, 10 minutes, or the like.

The method described herein may synchronize the language category with other modules, panels, or subsystems of the vehicle. For example, the head unit 104 may synchronize the language category with the instrument panel (e.g., speedometer, fuel gauge, temperature gauge). In one implementation, the head unit 104 may output a notification to the vehicle user 112 that the language category is synchronized between the multiple systems of the vehicle 102 (e.g., head unit, TSP, instrument panel).

FIG. 3 is a block diagram of the machine learning engine 114 according to one example. The machine learning engine 114 may include a speech capture device 302, a digital signal processing (DSP) module 304, a preprocessed signal database 306, a pattern matching engine 308, and a reference speech patterns database 310. The pattern matching engine 308 may execute one or more pattern matching algorithms to detect a recognized word or a recognized language category as would be understood by one of ordinary skill in the art. The speech capture device 302 may be the microphone included in the head unit 104. The pattern matching engine 308 may analyze phonemes in a context. For example, the pattern matching engine 308 may compare the phonemes to a large library of known words, phrases, and sentences stored in the reference speech patterns database 310. The pattern matching engine 308 then determines what language and contents the vehicle user 112 was probably saying. The machine learning engine 114 may output the recognized language and contents to the head unit 104.

Figure 4:
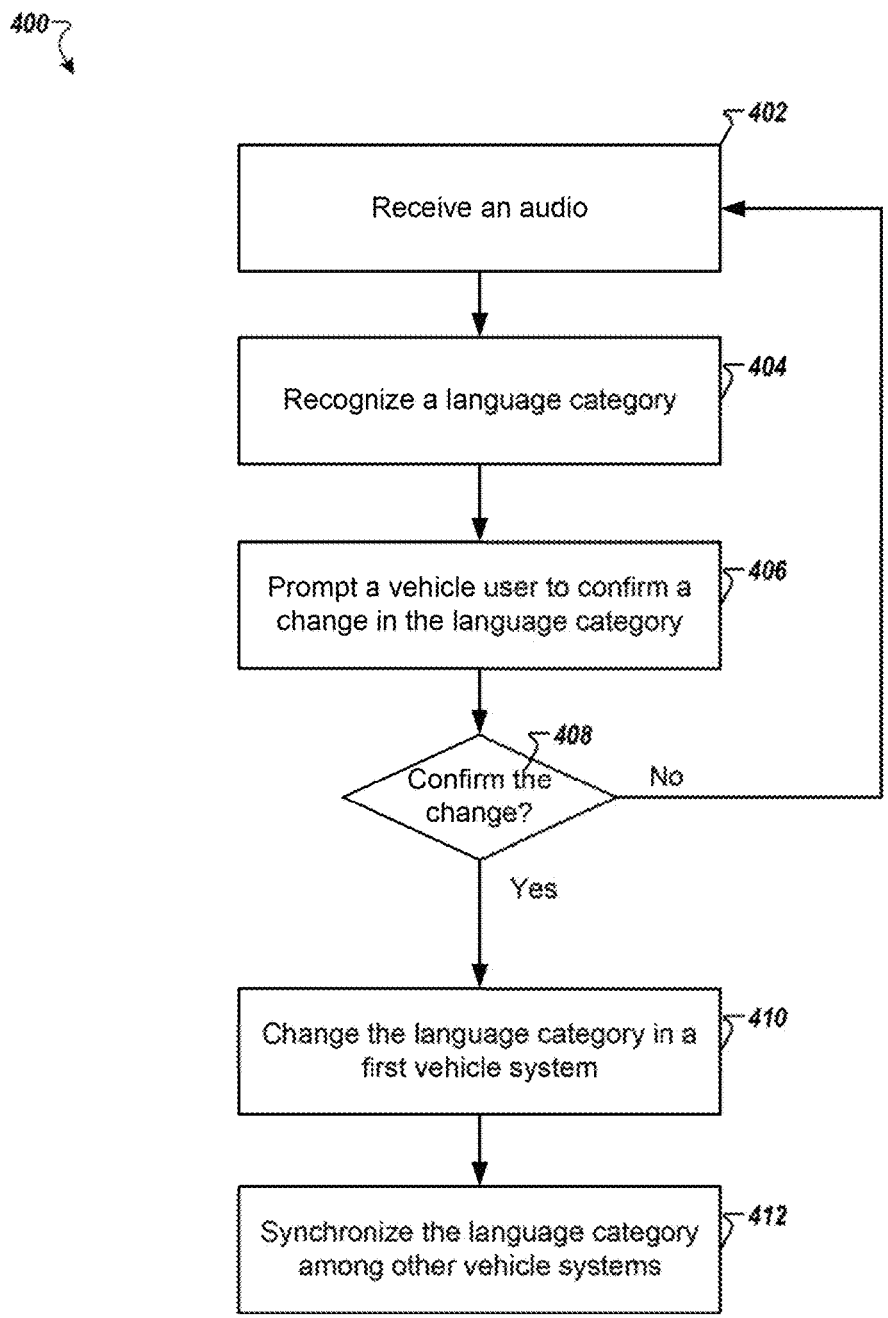
FIG. 4 is a flowchart for a language selection and synchronization process according to one example.

FIG. 4 is a flowchart for a language selection and synchronization process 400 according to one example. Process 400 may be performed by the head unit 104 of FIG. 1, either alone or in combination with other appropriate computer program.

At step 402, audio may be received. The head unit 104 may receive the audio via one or more microphones associated with the vehicle 102. The head unit 104 may monitor sounds in the vehicle 102 continuously or periodically. The head unit 104 may then derive samples from the captured audio for processing for example in the machine learning engine 114.

In one implementation, the head unit 104 may also detect audio not associated with the vehicle user 104. For example, the head unit 104 may detect audio from songs played from an entertainment module associated with the vehicle 102 or an electronic device associated with the vehicle user 112.

At step 404, the head unit 104 identifies the language category of the audio. For example, the machine learning engine 114 may detect and analyze the phonemes, rhythmic patterns, intonation patterns, and other appropriate structures of speech to identify the language in which the received audio is spoken. The machine learning engine 114 may further recognize contents of the audio.

The machine learning engine 114 may also determine a certainty level associated with the recognized language category. In one example, the head unit 104 may change the language category when the certainty level is above a predetermined threshold (e.g., 95%). In response to determining that the certainty level is below the predetermined threshold, the head unit 104 may continue to monitor sounds within the vehicle 102.

In one implementation, the machine learning engine 114 may recognize the language category for a predetermined period or a predetermined number of words before proceeding to step 406, as described previously herein.

At step 406, the head unit 104 may request confirmation that the language determination is correct and that the language setting is to be made when the language category is different from a current language category. For example, the head unit 104 may output data identifying the recognized language category. The data may be incorporated into the user interface which allows the user to confirm that the determined language is correct and to proceed with the changement in the language setting. For example, the head unit 104 may output "I recognize you are speaking Chinese. Would you like to switch your language category to Chinese?" Then, the head unit 104 may detect a user input at step 408.

In response to determining that the vehicle user wants to proceed with the change in the language settings, the process proceeds to step 410. In response to determining that the vehicle user 112 does not want to proceed with the change in the language settings, the process proceeds to step 402.

In one implementation, in response to determining that the user does not want to change the language setting, the head unit 104 may hold monitoring the spoken languages within the vehicle 102 for a predetermined time period (e.g., 15 minutes). In other implementations, the head unit 104 may detect an event before prompting the user to change the language setting after detecting a language category. The event may be turning off/on the vehicle 102, detecting that the door of vehicle has been opened/closed, or detecting one of multiple predefined prompts. The predefined prompts may include voice commands such as "Change the language category". For example, the head unit 104 may detect that the vehicle users may be speaking in "French" and prompt the user to whether the language setting may be changed to "French". In response to detecting a "no" from the user, the head unit 104 may continue to monitor and determine a spoken language within the vehicle 102. If the head unit 104 detects a new language category (i.e., other than French and the current language category), the head unit 104 may prompt the user to confirm the change in the language setting. For example, the vehicle user 112 may be familiar with multiple languages and does not want to trigger the language change if the vehicle user 114 is speaking another language. Similarly, the vehicle user 112 does not want to trigger a change of the language if passengers are speaking another language which may not be familiar to the vehicle user 112.

At step 410, the language category is changed in a first system of the vehicle 102. For example, the language category may be changed in the head unit 104.

At step 412, the language category may be synchronized among other vehicle systems. For example, the first system may output a signal indicating and controlling the language category of the other systems. For example, the head unit 104 may control the language category of the telematics module 106 and the instrument panel.

Steps may be omitted from the above-discussed process or steps may be performed in a different order.

A system which includes the features in the foregoing description provides numerous advantages to users. In particular, the system and the methodologies described herein may not require a vehicle user to manually interact with the head unit 104, thus not affecting driving operation and greatly improving user's experience.

The features of the present disclosure provide a multitude of improvements in the technical field of vehicle control. The method automatically detects audio within the vehicle to determine a language category. The method automatically synchronizes the language category of all user interfaces and systems of the vehicle to provide a consistent user experience in the vehicle. In addition, the method improves safety while driving by minimizing distraction of the user.

Figure 5:
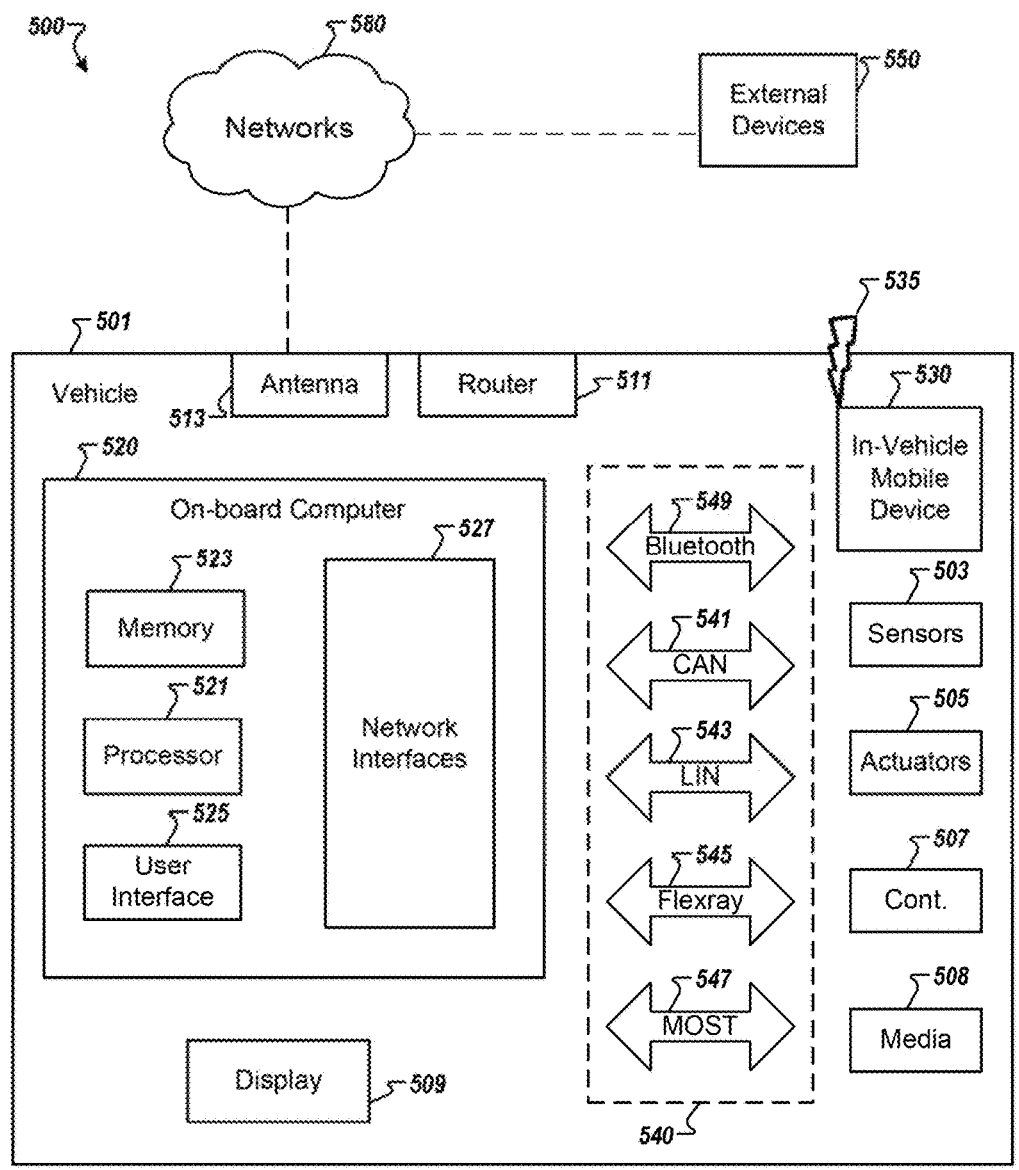
FIG. 5 is a block diagram of a vehicle environment according to one example.

FIG. 5 is a simplified block diagram of a vehicle environment 500 in which embodiments of the invention disclosed herein may be implemented. The vehicle environment 500 includes a vehicle 501 in communication with one or more external devices 550 by way of one or more external networks 580. Vehicle 501 also includes various internal networks 540 for interconnecting several vehicle devices within the vehicle as will be discussed below. The vehicle environment 500 may also include one or more in-vehicle mobile devices 530. External devices 550 include any device located outside the vehicle 501 such that the external device may communicate with the vehicle and its devices by an external network 580. For example, the external devices may include mobile devices, electronic devices in networked systems (e.g., servers or clients in a local area network (LAN), etc.), on board computers of other vehicles etc. In-vehicle mobile devices 530 are devices which are located within, or in the vicinity of the vehicle 501 such that the in-vehicle mobile device can communicate directly with internal networks 540 of the vehicle 501. In-vehicle mobile devices 530 may also connect with external networks 580.

Vehicle 501 includes vehicle devices integral with or otherwise associated with the vehicle 501. In the embodiment of FIG. 5, vehicle devices include one or more sensors 503, one or more actuators 505, one or more control units 507, one or more media systems 508, one or more displays 509, one or more routers 511, one or more antenna 513, and one or more on board computers 520. As used herein, the term "vehicle device" is meant to encompass sensors, actuators, controllers, electronic control units (ECUs), detectors, instruments, embedded devices, media devices including speakers, a CD and/or DVD player, a radio, vehicle navigation systems (e.g., GPS) displays, other peripheral or auxiliary devices or components associated with the vehicle 501.

Sensors 503 detect various conditions within (or in the immediate vicinity of) the vehicle 501. For example, sensors 503 may be temperature sensors, photosensors, position sensors, speed sensors, angle sensors or any other sensor for detecting a diagnostic condition or other parameter of the vehicle 501 or its ambient environment. Sensors 503 may be passive or "dumb" sensors that provide an analog representative of the sensed parameter, or so called "smart" sensors with integrated memory and digital processing capability to analyze the parameter sensed within the sensor itself. Actuators 505 cause motion of some mechanical element of the vehicle in response to a control signal. For example, actuators 505 may be hydraulic actuators, pneumatic actuators or electrical/electronic actuators such as a stepper motor.

Actuators 505 may also be "dumb" devices that react to a simple analog voltage input, or "smart" devices with built-in memory and processing capability. Actuators 505 may be activated based on a sensed parameter from sensors 503, and one such sensed parameter may be a physical position of the actuator 503 itself. Thus, the sensors 503 and actuators 505 may be connected in a feedback control loop for diagnostic detection and control of the vehicle 501.

On-board computer 520 is a vehicle device for providing general purpose computing functionality within the vehicle 501. The on-board computer 520 typically handles computationally intensive functions based on software applications or "apps" loaded into memory. On-board computer 520 may also provide a common interface for different communication networks in the vehicle environment 500. On-board computer 520 includes one or more processor 521, one or more memory 523, one or more user interface 525 (e.g., the operator interface described previously herein), and one or more network interface 527.

Multiple internal vehicle networks represented by 540 may exist in the vehicle 501 to provide communication pathways to various vehicle devices distributed throughout the vehicle 501. An internal vehicle network 540 is a collection of nodes, such as vehicle devices, integrated with or otherwise linked to the vehicle and interconnected by communication means. Vehicle networks 540 typically include hard wired bus type networks, each providing communication pathways to particular vehicle devices distributed throughout a vehicle. FIG. 5 shows four examples of such hard wired networks: Controller Area Network (CAN) 541, Local Internet Network (LIN) 543, Flexray bus 545, and Media Oriented System Transport (MOST) network 547.

Other hard wired internal networks such as Ethernet may be used to interconnect vehicle devices in the vehicle 501. Further, internal wireless networks 549, such as near field communications, Bluetooth, etc. may interconnect vehicle devices.

Users (driver or passenger) may initiate communication in vehicle environment 500 via some network, and such communication may be initiated through any suitable device such as, in-vehicle mobile device 530, display 509, user interface 525, or external devices 550.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for language selection and synchronization, the method comprising:
  receiving an audio representative of sounds captured within a vehicle;

recognizing, using processing circuitry of a vehicle system, a language category for propagating information to a user of the vehicle according to the received audio;

determining whether to change the language category to the recognized language category based on the captured sounds;

selecting the language category of the vehicle system according to the recognized language category in response to receiving a user acknowledgment;

deactivating language monitoring in response to receiving a user rejection of the recognized language category;

synchronizing the language category among a plurality of vehicle systems; and propagating information to the user of the vehicle using the synchronized language category, wherein synchronizing the language category includes outputting a control signal that indicates a duration of a change of the language category.

2. The method of claim 1, further comprising:

prompting a vehicle user to confirm a change in the language category in response to determining that the recognized language category does not match a previously set language category.

3. The method of claim 2, wherein a prompt message is in an audio format.

4. The method of claim 2, wherein a prompt message is output in two or more language categories.

5. The method of claim 1, wherein the step of synchronizing the language category includes outputting the control signal to the plurality of vehicle systems.

6. The method of claim 1, wherein the vehicle system is a navigation system.

7. The method of claim 1, further comprising:

providing information associated with the vehicle system in the recognized language category.

8. The method of claim 1, wherein the recognized language category is selected for a temporary period.

9. The method of claim 1, wherein the plurality of systems includes a telematics module and an instrument panel.

10. The method of claim 1, wherein the language monitoring is deactivated until a detection by the processing circuitry of a predetermined event.

11. A system for language selection and synchronization, the system comprising:

a plurality of vehicle systems; and processing circuitry configured to receive an audio representative of sounds captured within a vehicle;

recognize a language category for propagating information to a user of the vehicle according to the received audio;

determine whether to change the language category to the recognized language category based on the captured sounds;

select the language category of a vehicle system according to the recognized language category in response to receiving a user acknowledgment;

deactivate language monitoring in response to receiving a user rejection of the recognized language category;

synchronize the language category among the plurality of vehicle systems; and propagate information to the user of the vehicle using the synchronized language category, wherein synchronizing the language category includes outputting a control signal that indicates a duration of a change of the language category.

12. The system of claim 11, wherein the processing circuitry is further configured to:

prompt a vehicle user to confirm a change in the language category in response to determining that the recognized language category does not match a previously set language category.

13. The system of claim 12, wherein a prompt message is in an audio format.

14. The system of claim 12, wherein a prompt message is output in two or more language categories.

15. The system of claim 11, wherein the processing circuitry is further configured to:

output the control signal to the plurality of vehicle systems.

16. The system of claim 11, wherein the vehicle system is a navigation system.

17. The system of claim 11, wherein the processing circuitry is further configured to:

provide information associated with the vehicle system in the recognized language category.

18. The system of claim 11, wherein the recognized language category is selected for a temporary period.

19. The system of claim 11, wherein the plurality of systems includes a telematics module and an instrument panel.

20. A non-transitory computer readable medium storing computer-readable instructions therein which when executed by a computer cause the computer to perform a method for language selection and synchronization, the method comprising:

receiving an audio representative of sounds captured within a vehicle;

recognizing a language category for propagating information to a user of the vehicle according to the received audio;

selecting the language category of a vehicle system according to the recognized language category in response to receiving a user acknowledgment;

determining whether to change the language category to the recognized language category based on the captured sounds;

deactivating language monitoring in response to receiving a user rejection of the recognized language category;

synchronizing the language category among a plurality of vehicle systems; and propagating information to the user of the vehicle using the synchronized language category, wherein synchronizing the language category includes outputting a control signal that indicates a duration of a change of the language category.

* * * * *